(12) United States Patent
Timmroth et al.

(10) Patent No.: US 10,662,297 B2
(45) Date of Patent: May 26, 2020

(54) PLASTIC COMPOSITION, PRODUCTION METHOD, AND USE OF SAME

(71) Applicant: ATP Aicher + Tröbs Produktentwicklung GmbH, Teisendorf (DE)

(72) Inventors: René Timmroth, Ainring (DE); Helmut Aicher, Neukirchen (DE); Stefan Tröbs, Oberteisendorf (DE)

(73) Assignee: ATP AICHER + TRÖBS PRODUKTENTWICKLUNG GMBH, Teisendorf (DE)

( * ) Notice: Subject to any disclaimer, the term of this patent is extended or adjusted under 35 U.S.C. 154(b) by 304 days.

(21) Appl. No.: 15/752,858

(22) PCT Filed: Jul. 14, 2016

(86) PCT No.: PCT/EP2016/001231
§ 371 (c)(1),
(2) Date: Feb. 14, 2018

(87) PCT Pub. No.: WO2017/028939
PCT Pub. Date: Feb. 23, 2017

(65) Prior Publication Data
US 2019/0002647 A1    Jan. 3, 2019

(30) Foreign Application Priority Data

Aug. 14, 2015  (DE) .................. 10 2015 010 553
Nov. 25, 2015  (DE) .................. 10 2015 015 276

(51) Int. Cl.
| | | |
|---|---|---|
| C08J 3/20 | (2006.01) | |
| C08K 3/013 | (2018.01) | |
| C08K 3/10 | (2018.01) | |
| C08K 3/08 | (2006.01) | |
| C08K 5/05 | (2006.01) | |
| C08K 5/053 | (2006.01) | |
| C08K 5/098 | (2006.01) | |
| C08L 101/00 | (2006.01) | |
| B29B 7/90 | (2006.01) | |
| B29C 45/00 | (2006.01) | |
| C08K 3/22 | (2006.01) | |
| C08K 13/02 | (2006.01) | |
| B29K 77/00 | (2006.01) | |
| B29K 505/02 | (2006.01) | |

(52) U.S. Cl.
CPC .................. *C08J 3/203* (2013.01); *B29B 7/90* (2013.01); *B29C 45/0001* (2013.01); *C08J 3/20* (2013.01); *C08K 3/013* (2018.01); *C08K 3/08* (2013.01); *C08K 3/10* (2013.01); *C08K 3/22* (2013.01); *C08K 5/05* (2013.01); *C08K 5/053* (2013.01); *C08K 5/098* (2013.01); *C08K 13/02* (2013.01); *C08L 101/00* (2013.01); *B29K 2077/00* (2013.01); *B29K 2505/02* (2013.01); *C08J 2377/00* (2013.01); *C08K 2201/005* (2013.01)

(58) Field of Classification Search
CPC ....................................................... C08J 3/203
See application file for complete search history.

(56) References Cited

U.S. PATENT DOCUMENTS

2003/0104954 A1   6/2003   Reddy et al.
2016/0156040 A1   6/2016   Kopietz et al.

FOREIGN PATENT DOCUMENTS

DE    102013107514 A1    1/2015

OTHER PUBLICATIONS

ISA European Patent Office, International Search Report Issued in Application No. PCT/EP2016/001231, dated Sep. 26, 2016, WIPO, 4 pages.

*Primary Examiner* — Larry W Thrower
(74) *Attorney, Agent, or Firm* — McCoy Russell LLP

(57) ABSTRACT

The invention relates to a plastic composition, comprising (a) at least one polar thermoplastic polymer; (b) at least one metallic salt of an unsaturated aliphatic fatty acid; (c) at least one polyhydric alcohol, the melting point of which is no more than 80° C. below and no more than 50° C. above the melting point of the polymer (a); and (d) at least one further alcohol that is different from the alcohol (c), and the boiling point of which is no more than 100° C. below and no more than 80° C. above the melting point of the polymer (a).

20 Claims, No Drawings

PLASTIC COMPOSITION, PRODUCTION METHOD, AND USE OF SAME

CROSS-REFERENCE TO RELATED APPLICATIONS

The present application is a U.S. National Phase of International Patent Application Serial No. PCT/EP2016/001231, entitled "PLASTIC COMPOSITION, PRODUCTION METHOD, AND USE OF SAME," filed on Jul. 14, 2016. International Patent Application Serial No. PCT/EP2016/001231 claims priority to German Patent Application No. 10 2015 010 553.1, filed on Aug. 14, 2015, and claims priority to German Patent Application No. 10 2015 015 276.9 filed on Nov. 25, 2015. The entire contents of each of the abovementioned applications are hereby incorporated by reference in their entirety for all purposes.

TECHNICAL FIELD

The invention relates to a filled plastic composition, to a method of same and to the use of same.

BACKGROUND AND SUMMARY

The use of a filled plastic composition for manufacturing functional components is known from the prior art. Such compositions typically comprise a plastic matrix and a filler material.

A high filler material portion is desirable to improve some properties of such functional components. An increasing filler material portion can, for example, produce an increase or a greater value of the thermal conductivity, of the density, of the magnetic properties, or of the screening effect with respect to electromagnetic signals and ionizing radiation. A great improvement of some properties can in particular be observed when the filler material portion is close to the theoretical maximum since the number of particle contacts increases greatly in this range. It is possible to speak of a proximity to the theoretical maximum when the volume fraction of the filler material comes close to the volume fraction of the native filler material particles with a maximum packing density. The volume fraction of the native filler material particles at a maximum packing density results directly from the particle size distribution.

On the other hand, as the filler material portion increases, the melt viscosity of the plastic compositions also rises, whereby high-filled compositions of this type are not accessible to every processing technology. Whereas molding compounds and casting compounds can be highly loaded with filler material in part at the cost of design freedom, highly filled plastic compositions are often not suitable for a processing within the framework of a variable injection molding process or extrusion process. Furthermore, some mechanical properties of the components are degraded by a high filler material portion and the highly filled components tend to be brittle.

DETAILED DESCRIPTION

It is the object of the invention to provide plastic compositions that are as highly filled as possible that can be processed within the framework of an injection molding process or extrusion process and that additionally have acceptable mechanical properties.

DE 10 2013 107 514 A1 discloses a composite semifinished product having a high filler material portion that can be brought into shape by injection molding. The composite semifinished product comprises a thermoplastic such as polyamide, PVC, PPS or PEEK and a high portion of a filler material, for example metal and/or a metal compound.

Against this background, the invention relates to a highly filled plastic composition comprising (a) at least one polar thermoplastic polymer; (b) at least one metallic salt of an unsaturated aliphatic fatty acid; (c) at least one polyhydric alcohol, whose melting point is no more than 80° C. below and no more than 50° C. above the melting point of the polymer (a); (d) at least one further alcohol that is different from the alcohol (c), and whose boiling point is no more than 100° C. below and no more than 80° C. above the melting point of the polymer (a); and (e) at least one particulate filler material.

The boiling point at normal pressure is to be understood as the boiling point.

The filled composition can be present in pellet form to be able to be processed, for example, within the framework of an extrusion process or injection molding process. The composition can furthermore be present as a solid component that can be obtained, for example, using an extrusion process or an injection molding process.

In an embodiment, the filled plastic composition in accordance with the invention is a highly filled plastic composition whose filler material portion amounts to more than 40 vol. %, measured at the total volume of the filled composition. In a preferred embodiment, the filler material portion amounts to more than 50 vol. %. In a further preferred embodiment, the filler material portion can amount to more than 60 vol. %.

In an embodiment, the particular filler material (e) has a unimodal distribution of the particle sizes. In an alternative embodiment, the filler material has a multimodal distribution of the particle sizes.

The invention includes the idea that the filler portion in the highly filled plastic composition is close to the theoretical maximum that results from the particle size distribution. With filler materials having a unimodal distribution of the particle sizes, the theoretical maximum is typically lower (for example at 65 vol. % there) than with filler materials having a multimodal distribution of the particle sizes (at 75 vol. % there, for example). It has been recognized that a number of physical properties of highly filled plastic compositions, for example their thermal conductivity, depend less on the absolute filler material portion than on the proximity of the filler material portion to the theoretical maximum. The effect is presumably based on the fact that these effects are decisively influenced by the number of particle contacts of the filler material and that this number increases greatly close to the theoretical maximum.

Provision is therefore made in an embodiment that the filler material portion in the plastic composition amounts to at least 80 vol. %, preferably at least 90 vol. %, and further preferably at least 95 vol. %, of the theoretical maximum.

The unfilled plastic composition can be combined under the term "organic material". In the highly filled plastic compositions or in the plastic compositions in accordance with the invention filled close to the packing limit, it is assumed that the polyhydric alcohol (c) contributes to an increase in the melt volume and to a degradation of the melt viscosity during processing, that the polyhydric alcohol (c) in the completed component contributes to an increase in the affinity or bond strength between the organic material and the filler material, that the further alcohol (d) forms a gas phase during the processing and thus further increases the volume of the organic material and further degrades the viscosity, that the further alcohol (d) in the completed component contributes to an increase in the affinity or bond strength between the organic material and the filler material, and that the salt (b) contributes to a homogenization of the mixture.

In an embodiment, the filler material (e) is a metal powder, a metal oxide powder, or an oxide ceramic powder. The use of mixtures comprising such powders and the use of non-oxide ceramic powders, as such or in a mixture, is also conceivable and covered by the invention.

The filler material particles preferably have a spherical or granular design. In an embodiment, the average grain diameter of the filler materials is between 1 µm and 150 µm, preferably between 20 µm and 100 µm. The average grain diameter of the filler materials can be determined by sieve analysis in accordance with DIN 66165, for example.

In an embodiment, the melting point of the polyhydric alcohol (c) is no more than 50° C. below and/or no more than 30° C. above the melting point of the polymer (a).

In an embodiment, the boiling point of the further alcohol (c) is no more than 70° C. below and/or no more than 50° C. above the melting point of the polymer (a).

The specified general, and preferably maximum, boiling point and melting point differences between the ingredients (a), (c), and (d) have the background that, on the one hand, the polymer (a) and the polyhydric alcohol (c) should be present in a melted state during the processing and the further alcohol (d) should be present in gaseous form during the processing, and that, on the other hand, none of the substances should decompose. The fact that the boiling point the further alcohol (d) can be up to 100° C. below the melting point of the polymer (a) at normal pressure is due to the fact that local pressures of multiple bar can possibly be adopted during the processing that result in an increase of the boiling point.

The polar polymers (a) comprise or consist of repeat units that in turn have at least two different atoms whose electronegativity differences from one another in accordance with the Pauling scale of at least 0.5 and preferably at least 0.9, or at least 1.2. At least one carbon atom or at least one aromatic unit is preferably disposed between the two different atoms having said electronegativity difference within the repeat unit. There is, for example, at least one methylene group between said atoms. The repeat units preferably comprise at least one protic group, for example an OH— group and/or an NH— group.

In an embodiment, the polymer (a) has an average molar mass of between 104 and 106 g/mol. The average molar mass of suitable polymers (a) can, for example, be between 30,000 and 100,000 g/mol.

In an embodiment, the melting point of the polymer (a) is between 140° C. and 400° C.

In an embodiment, the polymer (a) is a semicrystalline polymer having a degree of crystallinity of less than 80%. The degree of crystallinity can, for example, be between 30 and 60%.

In an embodiment, the polydispersity of the polymer (a) is less than 5.

In an embodiment, the polymer (a) comprises a polyamide. Only a polyamide can also be used as the polymer.

Suitable polyamides include aliphatic, semiaromatic or aromatic polyamides, for example polyamide 6, polyamide 66, or a copolyamide. Mixtures of different polyamides that, for example, include polyamide 6, polyamide 66, polyamide 46, polyamide 12 and/or co/terpolyamides can also be used. Mixtures of polyamide(s) and other thermoplastic polymers such as polyolefins are furthermore suitable.

Further suitable polymers include polyimides, polysulfonamides, polyvinyl alcohols, halogenated polymers, and polymers having acid groups that are polar in the sense of the above definition.

In an embodiment, the fatty acid of the salt (b) is a monovalent carboxylic acid having more than 8 carbon atoms and at least one double bond. The carboxylic acids preferably comprise fewer than 25 carbon atoms. The preferred number of double bonds is between 1 and 5. The number of carbon atoms can amount to between 15 and 20, for example. The number of double bonds can amount to 1 or 2, for example. Suitable carboxylic acids include oleic acid and linoleic acid. The cation of the salt can, for example, be an alkali metal, in particular sodium or potassium.

In an embodiment, the proportion of the salt (b) in the unfilled composition, i.e. in the organic material, amounts to between 1 and 15% by weight. Preferred ranges include proportions of more than 3% by weight and of less than 7% by weight.

In an embodiment, the polyhydric alcohol (c) has between 2 and 9 hydroxyl groups.

In an embodiment, the polyhydric alcohol (c) has only carbon atoms and, possibly, furthermore oxygen atoms in the main chain.

The main chain of the polyhydric alcohol (c) can be linear or cyclic or can have linear and cyclic portions.

Examples for suitable polyhydric alcohols (c) include 1,2-ethanediol, 1,2-propandiol, 1,3-propandiol, 2,2-bis(hydroxymethyl)-1,3-propandiol, 1,2,3-propanetriol, 1,2-butanediol, 1,3-butanediol, 1,4-butanediol, 2,3-butanediol, 2,2-bis(hydroxymethyl)-1,3-butanediol, 2-butene-1,4-diol, 2-butyne-1,4-diol, 1,2,4-butanetriol, butane-1,2,3,4-tetrol, 1,6-hexanediol, 1,2,6-hexanetriol, 3-hexine-2,5-diol, 3-hexine-2,5-diol, mannitol, xylitol, polyols from the group of monosaccharides (for example fructose, lactose or mannose) and vinyl alcohol polymers.

In an embodiment, the proportion of the polyhydric alcohol (c) in the unfilled composition, i.e. in the organic material, amounts to between 3 and 40% by weight. Preferred ranges include proportions of more than 10% by weight and of less than 30% by weight.

In an embodiment, the further alcohol (d) is monohydric or polyhydric and optionally aromatic alcohol. The proportion of the further alcohol (d) in the unfilled composition, i.e. in the organic material, can amount to between 3 and 20% by weight. Preferred volume fraction of the further alcohol (d) comprise proportions of more than 5% by weight and less than 15% by weight. Examples of suitable further alcohols (d) comprise methanol, ethanol, butanol, and hexanol. Further examples include phenylethyl alcohol, thiophenylmethyl alcohol, hydrocinnamyl alcohol, phenylmethy alcohol, 1-propylheptyl alcohol, 9-decen-1-ol, (α,α-dimethylphenyl)methanol, 1-dodecanol, (α-ethylphenyl)methanol, (4-hydroxylphenyl)methanol, (4-isopropylpheny)methanol, 4-methoxyphenylmethanol, (2-methylphenyl)methanol, 6-methyl-1-heptanol, (2-nitrophenyl)methanol, 1-nonanol, 1-octacosanol, 1-octanol, 2-octanol, 1-tetradecanol, 1-tridecanol, 1-undecanol and 2-undecanol.

The weight proportion of the polymer (a) in the organic material results from the difference between the sum of the fractions of the further additives and 100% by weight.

Further suitable additives include phenols such as phenol, cresol, resorcinol, hydroquinone, bisphenol A, and their halogenated derivatives. Further suitable additives include unsubstituted or halogenated organic acid such as formic acid or acetic acid. Further suitable esters include fatty acid esters. Fatty acid esters can, for example, have an influence on the melt viscosity drop of the plastic composition and/or can serve the pretreatment of the filler material (e). Further suitable additives include alkyl silanes. Further suitable additives include organic titanates, organic phosphonates, and organic phosphates. Each of these additives can, for example, be present in the composition in an amount between 0.1 and 5 vol. %.

Against the initially named background, the invention further relates to a method of manufacturing a filled plastic composition in accordance with the invention comprising the steps: A suspending the filler material (e) in a solvent; B admixing the salt (b) and the polyhydric alcohol (c) into the suspension; C drying the suspension for removing the solvent; D mixing the residue with the polymer (a); and E adding the further alcohol (d).

In the composition prepared in this manner, the salt (b) and the polyhydric alcohol (c) are not only simply present in the mixture, but rather adhere to the filler material due to the preceding surface treatment thereof.

A reaction phase can follow the admixing in accordance with step B prior to the drying in accordance with step C. The duration of this phase can amount to between 10 minutes and 2 hours, for example. Room temperature or also an elevated temperature can be selected as the temperature. An agitation of the suspension, by stirring for example, can take place during the reaction phase. Provision can alternatively be made that the suspension is stationary during the reaction phase.

The mixing in accordance with step D can take place in the dry state, with the powdery, optionally previously ground residue from step C being mixed with powdery or granulated polymer (a). A mixing in the molten state of the polymer is furthermore conceivable.

In an embodiment, the mixing in accordance with step D is followed by a compounding in the molten state, a cooling and a comminution.

The adding of the further alcohol (d) in accordance with step E can take place by spraying the comminuted, dry mixture with this further alcohol (d).

Suitable solvents include polar solvents, for example aprotic polar solvents such as acetone or protic polar solvents such as ethanol.

The invention finally relates, against the initially named background, to the use of a highly filled plastic composition in accordance with the invention for manufacturing a molding as part of an extrusion process or injection molding process.

The present invention provides the possibility of achieving a degree of volume filling of the filler material in the polymer in a sensible manner from a technical processing and mechanical aspect that is very close to the theoretically maximum packing density of the native filler material powder particles. Specific physical properties of the filler material such as magnetic properties or thermal conductivity can thus have a very strong effect in the plastic composition so that new areas e.g. in metal replacement can be opened up.

Further details and advantages of the invention will be explained in the following with reference to the prior art, to the demands made and to the presumed kind of cooperation of the filler material particles and the matrix. It must be noted here that these statements have an explanatory meaning and not a restrictive one, for example with regard to the required presence of a specific substance.

The compositions in accordance with the invention can be considered in an embodiment as a thermoplastic, organically modified plastic composition for the manufacture of highly packed plasticizable plastic-bonded powders/fibers/carbon nanotubes, whiskers or highly filled thermoplastics as a material for injection molding, extrusion, and similar processes. Applications include plastics having improved physical properties such as thermal conductivity, magnetic phenomena, high density, attenuation of ionizing radiation, screening from radio frequency and the effect of abrasion, and feedstocks for metal injection molding (MIM) and computer integrated manufacturing (CIM) processes as well as 3D printing processes.

Such materials have to satisfy different demand profiles in dependence on the application. Examples include those named in the following. A modified polymer system for this application has to satisfy the following demands in the completed component. It provides the material with its mechanical properties such as tensile strength, modulus of elasticity, durability, temperature resistance, hardness, and abrasion resistance. These demands apply both to the polymer per se and to the binding to the powdery/fibrous filler material. It must be chemically resistant with respect to environmental conditions and the process and application conditions. It must plasticize the total material, also at very high packing rates or at high degrees of filling and must enable a complex shape typical for plastic injection molding both during the compounding of the material and during the component manufacture. Equally, a layer must be produced on the adhesion/bond associated filler material surface that has excellent lubrication properties and withstands very high pressures. It must have a very low melt viscosity that is substantially lower than that of the native polymer. It must be able to compensate the difference in the packing density between the filler material in flow movement and the filler material resting in the very dense packing by a temporary volume increase. The solidification and crystallization behavior may not generate internal stresses that are too high in the component. Despite the strong bonding to the filler material particles in the heat under plasticization conditions, an easy demolding capability out of the tool must be ensured under solidification conditions.

In the prior art, the theoretical maximum achievable packing density of the powder is not even approximately reached in the above-named applications with any material. The polymer preparations on the basis of technical thermoplastics used in the prior art such as the weak polar polyamides PA 11, PA12 and similar or polyolefins at best enable contents with globular monomodal powders that are ≥10 vol. % below the values of approximately 65 vol. % with monomodal powders d90<45 µm which can be reached in accordance with the formula of LEE for particle size distributions. The values are even further removed with irregular morphologies, e.g. spaltered or plate-like morphologies. The contents equally additionally drop even further when more polar polymers of higher strengths are used such as PA 46, PA6 or PA 66. There is generally both a significant deterioration of the flow properties in the processing in injection molding and in particular of the mechanical properties from as early as >55 vol. % powder proportion with the above-named powders since the bonding of the polymer to the powder surface is not sufficiently strong. The limit for tungsten screening materials at a density of 11 $g/cm^3$ is therefore currently at the screening power of lead (14 $g/cm^3$ with a screening power >50% above lead should be possible) or the heat conductivity of an isotropic thermal conductivity plastic at 2-3 W/mK (15-20 W/mK should be possible according to Lewis & Nielsen on reaching the theoretical packing density). The same disproportion is also present in permanently magnetic and soft magnetic materials whose mechanical strengths additionally drop by a large amount. In the examples named as exemplary of the density previously achieved and achievable in accordance with the invention, the degree of volume filling amounts to approximately 16 vol. %, but the absolute volume of the filler material is doubled in the unchanging plastic volume. Synthetic resins for molding materials and casting materials and, recently chain-shortened polyolefins, achieve slightly better values. However, restrictions in the design freedom and in the profitability or in the possible conditions of use must be observed here with respect to the strength and the temperature.

In accordance with the present invention, polar polymers are used since most of the physically interesting filler materials likewise have polar surface properties. In addition to the known polyamides, their derivatives and alloys, the polymers also relate to the polyamides, polysulfonamides, polyvinyl alcohols, equally their derivatives and alloys, as well as to some specific halogen-containing polymers. Above all metal and metal oxide powders as well as oxide ceramic powders and, optionally, non-oxide ceramic powders were taken into account in the selected filler materials. A modular system of selected organic additives has been developed for highly filled thermoplastics to modify the base polymer. This enables the production of highly packed plasticizable plastic-bonded powders or of highly filled thermoplastics as materials for injection molding, extrusion and similar processes. The modular system enables the direct influencing of singular and multiple properties of the modified plastic both during the component manufacture and in the completed component. This invention is thus delineated from the developments of recent papers that have attempted to lower the viscosity of the filled plastics by the use of multimodal powder mixtures. Since the flow improvements here only allow an increase of the packing density, the physical properties degrade since the degree of volume filling cannot be increased to the same degree since the polymer melt lacks wetting capacity and lubrication film volume.

The properties of adhesion/bonding, viscosity, volume, strength, impact resistance, sliding or demolding can be set in a modular manner, with this not only being combined in a singular manner, but also in a multiple manner and at times synergistically. The melt viscosity of polar polymers is no longer sufficient for the implementation of high packing levels with a sufficiently complete and simultaneously movable wetting. Said melt viscosity has to be greatly reduced without a permanent loss of the molecular structure and without a drop of the force of adhesion/bonding at hydrophilic surfaces. In the sense of this invention, this is initially done by partial substitution of the highly viscous polymer melt viscosity having very low-viscous solvent viscosity and salt melt viscosity of suitable protic solvents and organic salts that are thermodynamically compatible with the polymer melts with respect to their boiling points and melting points. The viscosity obtained is substantially lower. The wetting capacity of a given melt volume thus increases a lot. To further increase the wetting capacity and to increase the lubrication film volume, the melt volume is furthermore simultaneously temporarily greatly increased, with primarily the melt volume of the liquid phase being increased whose volume growth is a requirement for the additional introduction of a secondary defined gas volume that additionally inflates the primarily generated liquid volume by the gas volume fraction.

The exact function of the dissolving of the polymers is not looked at in more detail here since it is basically known and is only used in an innovative manner here. The greater polarity of crystalline polyamide in a suitable solution is in particular used, beyond the very high viscosity-reducing effect, to obtain a large increase in the adhesive force toward the polar filler material by the diffusion-controlled lowering of the cohesive force of the polymer. For the developed organic material, this means that the adhesive force is more independent of the polarity of a filler material surface. The polyamide melt requires an alcohol whose melting point is close to its melt temperature. The melt volume of the polymer can be greatly increased by high volume fractions of these alcohols.

The polyhydric alcohols additionally act as plasticizers for the polyamides and, thanks to their high polarity and affinity both for polar filler materials and for the polymer matrix, improve the embedding of filler material particles by promoting the penetration of the polymer chains within the particle structure of the filler material. A lower added volume fraction of an alcohol in the liquid state that is, however, gaseous under melting conditions and that is likewise associated with the polymer over hydrogen bridges in the condensed state produces a further volume increase. The solvents additionally have a newly recognized effect on the impact resistance. The plasticizing effect of the condensed solvent phase in the solidified polymer has a similar effect to an elastomer. The miscibility and homogenization of the polyamide melt with the alcohol melt is improved by the addition of the fatty acid salts.

At the same time, these salts prevent the crystallization of the high-melting alcohols during the cooling and so prevent the material from becoming brittle. At the same time, they act as sliding means at high temperatures and as demolding means at lower temperatures. They furthermore have a strength-promoting effect on crystallization.

Further details and advantages of the invention result from the following described embodiment.

34.1 parts by volume of aluminum powder are added to 41.8 parts by volume of acetone in a suitable vessel and are stirred well. An aluminum powder having the following grain size classification is used as the aluminum powder: d5<10 µm, d10<15 µm, d20<20 µm, d50<25 µm, d70<30 µm, d80<35 µm, d100<145 µm. 1.1 parts by volume of sodium oleate and 4.4 parts by volume of 2.2 bis(hydroxymethyl) 1,3-propanediol are added to this suspension, are stirred and are left at room temperature for 30 min.

The suspension is subsequently dried.

The dried mixture is subsequently mixed with 15.4 parts by volume of polyamide-6 by stirring. Polyamide-6 has a degree of crystallinity of <45% and a mean molar mass of <70,000 g/mol. 3.2 parts by volume of phenylmethy alcohol are sprayed onto this powder mixture. The total mixture is homogeneously mixed by stirring in a simple mixer.

The obtained powdery composition is compounded in a sigma kneader and granulated in a mill ready for injection molding.

As a result, a thermoplastic injection-moldable composition of polyamide-6 and aluminum powder having a filler material portion of 62 vol. % is obtained. The theoretically maximum filler material portion on the use of said powder would amount to 65% by volume.

The invention claimed is:
1. A filled plastic composition comprising:
at least one polar thermoplastic polymer;
at least one metallic salt of an unsaturated aliphatic fatty acid;

at least one polyhydric alcohol, whose melting point is no more than 80° C. below and no more than 50° C. above the melting point of the at least one polar thermoplastic polymer;

at least one further alcohol that is different from the at least one polyhydric alcohol, and whose boiling point is no more than 100° C. below and no more than 80° C. above the melting point of the at least one thermoplastic polymer; and at least one particulate filler material.

2. The plastic composition in accordance with claim 1, wherein the plastic composition is a highly filled plastic composition whose filling material portion amounts to more than 40 vol. % measured at the total volume of the filled composition and/or more than 80 vol. % of the theoretical maximum.

3. The composition in accordance with claim 1, wherein the melting point of the at least one polyhydric alcohol is no more than 50° C. below and/or no more than 30° C. above the melting point of the at least one polar thermoplastic polymer; and/or wherein the boiling point of the further alcohol is no more than 70° C. below and/or no more than 50° C. above the melting point of the at least one polar thermoplastic polymer.

4. The composition in accordance with claim 1, wherein the particulate filler material is a metal powder, a metal oxide powder or an oxide ceramic powder; and/or wherein the mean grain diameter of the particulate filler materials is between 1 µm and 150 µm.

5. The composition in accordance with claim 1, wherein the at least one thermoplastic polymer has an average molar mass of between $10^4$ and $10^6$ g/mol; and/or wherein the melting point of the at least one thermoplastic polymer is between 140° C. and 400° C.

6. The composition in accordance with claim 1, wherein the at least one thermoplastic polymer is a semicrystalline polymer having a degree of crystallinity of less than 80%; and/or wherein the polydispersity of the at least one thermoplastic polymer is less than 5.

7. The composition in accordance with claim 1, wherein the at least one thermoplastic polymer comprises a polyamide; and/or wherein the at least one thermoplastic polymer is a polyamide.

8. The composition in accordance with claim 1, wherein the fatty acid of the at least one metallic salt is a monovalent carboxylic acid having more than 8 carbon atoms and having at least one double bond.

9. The composition in accordance with claim 1, wherein the portion of the at least one metallic salt in the unfilled composition amounts to between 1 and 15% by weight, and preferably between 3 and 7% by weight.

10. The composition in accordance with claim 1, wherein the at least one polyhydric alcohol has between 2 and 8 hydroxyl groups; and/or wherein the at least one polyhydric alcohol in the main chain, that can be linear or cyclic or can have linear and cyclic sections, has only carbon atoms and, optionally, oxygen atoms.

11. The composition in accordance with claim 1, wherein the fraction of the at least one polyhydric alcohol in the unfilled composition amounts to between 3 and 40% by weight, and preferably between 10 and 30% by weight.

12. The composition in accordance with claim 1, wherein the further alcohol is a monohydric or polyhydric aromatic alcohol; and/or wherein the portion of the further alcohol in the composition amounts to between 3 and 20% by weight, and preferably to between 5 and 15% by weight.

13. A method of manufacturing a filled plastic composition, said method comprising the following steps:
   A. suspending a particulate filler material in a solvent;
   B. admixing at least one metallic salt of an unsaturated aliphatic fatty acid and at least one polyhydric alcohol, whose melting point is no more than 80° C. below and no more than 50° C. above the melting point of at least one polar thermoplastic polymer, into the suspension;
   C. drying the suspension to remove the solvent;
   D. mixing the residue with the at least one thermoplastic polymer; and
   E. adding a further alcohol that is different from the at least one polyhydric alcohol, and whose boiling point is no more than 100° C. below and no more than 80° C. above the melting point of the at least one thermoplastic polymer.

14. The method of claim 13, wherein the melting point of the at least one polyhydric alcohol is no more than 50° C. below and/or no more than 30° C. above the melting point of the at least one polar thermoplastic polymer; and/or wherein the boiling point of the further alcohol is no more than 70° C. below and/or no more than 50° C. above the melting point of the at least one polar thermoplastic polymer.

15. The method of claim 13, wherein the filler material is a metal powder, a metal oxide powder or an oxide ceramic powder; and/or wherein the mean grain diameter of the filler material is between 1 µm and 150 µm.

16. The method of claim 13, wherein the further alcohol is a monohydric or polyhydric aromatic alcohol; and/or wherein the portion of the further alcohol in the composition amounts to between 3 and 20% by weight, and preferably to between 5 and 15% by weight.

17. A method of manufacturing a molded part as part of an extrusion or injection molding process comprising using a filled plastic composition, wherein the filled plastic composition is produced using the following steps:
   A. suspending a particulate filler material in a solvent;
   B. admixing at least one metallic salt of an unsaturated aliphatic fatty acid and at least one polyhydric alcohol, whose melting point is no more than 80° C. below and no more than 50° C. above the melting point of at least one polar thermoplastic polymer, into the suspension;
   C. drying the suspension to remove the solvent; and
   D. mixing the residue with the at least one thermoplastic polymer; and
   E. adding a further alcohol that is different from the at least one polyhydric alcohol, and whose boiling point is no more than 100° C. below and no more than 80° C. above the melting point of the at least one thermoplastic polymer; and wherein the filled plastic composition is processed within the framework of an injection molding process or extrusion process.

18. The method of claim 17, wherein the melting point of the at least one polyhydric alcohol is no more than 50° C. below and/or no more than 30° C. above the melting point of the at least one polar thermoplastic polymer; and/or wherein the boiling point of the further alcohol is no more than 70° C. below and/or no more than 50° C. above the melting point of the at least one polar thermoplastic polymer.

19. The method of claim 17, wherein the filler material is a metal powder, a metal oxide powder or an oxide ceramic powder; and/or wherein the mean grain diameter of the filler material is between 1 pm and 150 pm.

20. The method of claim 17, wherein the further alcohol is a monohydric or polyhydric aromatic alcohol; and/or wherein the portion of the further alcohol in the composition amounts to between 3 and 20% by weight, and preferably to between 5 and 15% by weight.

\* \* \* \* \*